(12) United States Patent
Ahn (10) Patent No.: US 11,399,412 B2
(45) Date of Patent: Jul. 26, 2022

(54) DATA CAPACITY SHARING SERVER, METHOD AND SYSTEM FOR SHARING DATA CAPACITY DONATED BY TERMINAL

(71) Applicant: Sang Joon Ahn, Yongsan-Gu Seoul (KR)

(72) Inventor: Sang Joon Ahn, Yongsan-Gu Seoul (KR)

(73) Assignee: Sang Joon Ahn, Yongsan-Gu Seoul (KR)

( * ) Notice: Subject to any disclaimer, the term of this patent is extended or adjusted under 35 U.S.C. 154(b) by 30 days.

(21) Appl. No.: 16/976,265

(22) PCT Filed: Feb. 13, 2019

(86) PCT No.: PCT/KR2019/001744
§ 371 (c)(1),
(2) Date: Aug. 27, 2020

(87) PCT Pub. No.: WO2019/168283
PCT Pub. Date: Sep. 6, 2019

(65) Prior Publication Data
US 2020/0413484 A1    Dec. 31, 2020

(30) Foreign Application Priority Data
Feb. 27, 2018    (KR) .................. 10-2018-0023979

(51) Int. Cl.
*H04W 88/04*    (2009.01)
*G06Q 20/32*    (2012.01)
(Continued)

(52) U.S. Cl.
CPC .......... *H04W 88/04* (2013.01); *G06Q 20/322* (2013.01); *H04W 4/24* (2013.01); *H04W 28/0247* (2013.01); *H04W 28/0252* (2013.01)

(58) Field of Classification Search
CPC ... H04W 88/04; H04W 4/24; H04W 28/0247; H04W 28/0252; H04W 16/00;
(Continued)

(56) References Cited

U.S. PATENT DOCUMENTS

2012/0143978 A1* 6/2012 Coussemaeker ...... H04W 12/08
709/208
2012/0303823 A1* 11/2012 Nair .................... H04W 48/18
709/227
(Continued)

FOREIGN PATENT DOCUMENTS

KR    10-2012-0099823    9/2012
KR    10-2014-0077777    6/2014
(Continued)

OTHER PUBLICATIONS

International Search Report in International Application No. PCT/KR2019/001744, dated May 27, 2019 (4 pages).

*Primary Examiner* — Hassan Kizou
*Assistant Examiner* — Abdullahi Ahmed
(74) *Attorney, Agent, or Firm* — Nixon Peabody LLP (57) ABSTRACT

The present invention relates to a server, a method and a system for allowing a user terminal to receive and use a data capacity shared by a donor terminal, and provide a reward that is as much as the data capacity shared by the donor terminal and provide, to the user terminal, charging information corresponding to the use of data, thereby enabling a fair and meaningful compensation system.

14 Claims, 4 Drawing Sheets

(51) Int. Cl.
*H04W 4/24* (2018.01)
*H04W 28/02* (2009.01)

(58) Field of Classification Search
CPC .. G06Q 20/322; G06Q 20/123; G06Q 20/145; G06Q 20/305; G06Q 20/32; G06Q 50/30; H04L 29/06; H04L 29/08; H04L 63/0876; H04L 67/22; H04M 15/28; H04M 15/41; H04M 15/78; H04M 15/8083; H04M 15/88; H04M 15/882
See application file for complete search history.

(56) References Cited

U.S. PATENT DOCUMENTS

| | | | | |
|---|---|---|---|---|
| 2013/0171964 A1* | 7/2013 | Bhatia | .................... | H04W 12/08 |
| | | | | 455/411 |
| 2013/0331028 A1* | 12/2013 | Kuehnel | ............... | H04W 76/10 |
| | | | | 455/41.1 |
| 2017/0018001 A1* | 1/2017 | Tunnell | ................. | H04L 67/306 |
| 2017/0161709 A1* | 6/2017 | Tunnell | ................. | G06Q 20/20 |

FOREIGN PATENT DOCUMENTS

| | | |
|---|---|---|
| KR | 10-2015-0049721 | 5/2015 |
| KR | 10-2015-0094884 | 8/2015 |
| KR | 10-1710810 | 3/2017 |

* cited by examiner

DATA CAPACITY SHARING SERVER, METHOD AND SYSTEM FOR SHARING DATA CAPACITY DONATED BY TERMINAL

REFERENCES TO RELATED APPLICATIONS

This application is a U. S. national stage of PCT/KR2019/001744 filed on Feb. 13, 2019, which claims the benefits of the Korean patent application No. 10-2018-0023979, filed on Feb. 27, 2018, the contents of which are all incorporated herein by reference in their entireties.

TECHNICAL FIELD

Embodiments of the inventive concept described herein relate to a data capacity sharing server, method, and system for sharing a data capacity donated by a terminal, and more particularly, relate to technologies for allowing a user terminal to receive and use a data capacity shared by a donor terminal.

BACKGROUND ART

In general, a terminal device such as a portable terminal refers to a device which performs a communication function or a specific function of the corresponding device, while being carried by a user. The portable terminal may be devices such as a smartphone, a tablet PC, and a laptop computer. The above-mentioned portable terminal may perform various functions such as communication, a camera, the Internet, video playback, and broadcast reception.

However, because the above-mentioned portable terminal mainly uses a limited data capacity, it has a limit to the amount of data use. Such a situation may occur at home or abroad.

Thus, various attempts are performed to overcome the above-mentioned limit to the amount of data use.

Herein, an existing data sharing technology is only a technology of sharing images, video files, data files, or the like between a donor terminal and a user terminal. There is a limit in a technology of sharing a wireless Internet service.

Thus, the inventive concept proposes a technology of opening an AP and sharing the AP with a plurality of unspecified user terminals to wirelessly access the Internet, when there is a spare for a limit to the total amount of data of a used Internet service.

DETAILED DESCRIPTION OF THE INVENTION

Technical Problem

The object of the inventive concept is to provide a virtual marketplace where a plurality of unspecified user terminals may receive and use ECObit shared over a data network opened by a donor terminal.

Furthermore, the object of the inventive concept is to provide a reward as much as a data capacity shared by a donor terminal and provide a user terminal with charging information corresponding to data use to provide a fair and meaningful compensation system.

Technical Solution

According to an exemplary embodiment, a method for sharing data capacity donated by a terminal may include monitoring data information to be shared based on a data tethering signal received from a donor terminal, receiving a request of a user terminal which is located in communication coverage of the donor terminal and wants to use a data network opened by the donor terminal, performing security authentication depending on whether the user terminal subscribes to a service, managing use of ECObit into which a data capacity shared by the donor terminal is virtualized and data use of the user terminal which uses shared ECObit, and providing the donor terminal with a reward corresponding to ECObit shared by the donor terminal and providing the user terminal with charging information according to the use of data used by the user terminal.

The monitoring of the data capacity shared by the donor terminal may include receiving the data tethering signal according to a tethering mode of the donor terminal and monitoring the data information including at least one or more of a data tariff used by the donor terminal, a data usage period, or a data capacity to be shared.

The performing of the security authentication may include classifying the user terminal which wants to use ECObit as a member or a non-member depending on whether the user terminal subscribes to the service and performing a security authentication mechanism of the user terminal which detects a wired backhaul network or a wireless backhaul network according to the member or the non-member and communicates with the donor terminal.

The managing of the use of the ECObit and data may include tracking and managing ECObit to be shared by the donor terminal, ECObit consumed by the donor terminal due to the user terminal, and the data use of the user terminal which uses ECObit.

The providing of the reward and the charging information may include providing at least one or more rewards among a data capacity, a crytocurrency, and a point, which correspond to the ECObit shared by the donor terminal, depending on a request of the donor terminal.

The providing of the reward and the charging information may include providing the charging information to which a settlement exchange rate for the data use of the user terminal is applied, depending on a member or non-member of the user terminal or the result of the security authentication for a wired backhaul network or a wireless backhaul network for data use.

According to an exemplary embodiment, a system for sharing data capacity donated by a terminal may include a donor terminal that performs a data tethering mode to donate a data capacity, a user terminal that is located in communication coverage of the donor terminal and uses a data network opened by the donor terminal and a data capacity sharing server that monitors data information to be shared by the donor terminal based on a data tethering signal received from the donor terminal and manages sharing of ECObit into which a data capacity between the donor terminal and the user terminal is virtualized. The data capacity sharing server may provide the donor terminal with a reward corresponding to ECObit shared by the donor terminal and may provide the user terminal with charging information according to the use of data used by the user terminal.

The donor terminal may receive at least one or more rewards among a data capacity, a crytocurrency, and a point, which correspond to the shared ECObit, from the data capacity sharing server.

The user terminal may receive and use ECObit shared over the data network opened by the donor terminal having the strongest signal intensity from the user terminal among a plurality of donor terminals located in the periphery.

the data capacity sharing server may classify the user terminal which wants to use a data capacity as a member or a non-member depending on whether the user terminal subscribes to a service and may perform a security authentication mechanism of the user terminal which detects a wired backhaul network or a wireless backhaul network according to the member or the non-member and communicates with the donor terminal.

The data capacity sharing server may track and manage ECObit to be shared by the donor terminal, ECObit consumed by the donor terminal due to the user terminal, and data use of the user terminal which uses ECObit.

The system for sharing the data capacity may obtain revenue from advertising fees provided between the data capacity sharing server, the donor terminal, and the user terminal.

The user terminal may select one of data networks (or access points (APs)) respectively opened by a plurality of donor terminals, when there are the plurality of donor terminals. The data capacity sharing server may provide information associated with an exchange condition such that the user terminal selects the one data network.

The user terminal may sell a possessed residual data capacity to the data capacity sharing server.

According to an exemplary embodiment, a data capacity sharing server may include a monitoring unit that monitors data information to be shared based on a data tethering signal received from a donor terminal, a receiving unit that receives a request of a user terminal which is located in communication coverage of the donor terminal and wants to use a data network opened by the donor terminal, an authentication performing unit that performs security authentication depending on whether the user terminal subscribes to a service, a management controller that manages use of ECObit into which a data capacity shared by the donor terminal is virtualized and data use of the user terminal which uses shared ECObit, and a providing unit that provides the donor terminal with a reward corresponding to ECObit shared by the donor terminal and provides the user terminal with charging information according to the use of data used by the user terminal.

The monitoring unit may receive the data tethering signal according to a tethering mode of the donor terminal and may monitor the data information including at least one or more of a data tariff used by the donor terminal, a data usage period, or a data capacity to be shared.

The authentication performing unit may classify the user terminal which wants to use ECObit as a member or a non-member depending on whether the user terminal subscribes to the service and may perform a security authentication mechanism of the user terminal which detects a wired backhaul network or a wireless backhaul network according to the member or the non-member and communicates with the donor terminal.

The management controller may convert, store, and manage the data capacity shared by the donor terminal into virtualized ECObit and may track and manage ECObit to be shared by the donor terminal, ECObit consumed by the donor terminal due to the user terminal, and data use of the user terminal which manages data use of the user terminal which uses ECObit.

The providing unit may provide at least one or more rewards among a data capacity, a crytocurrency, and a point, which correspond to the ECObit shared by the donor terminal, depending on a request of the donor terminal.

The providing unit may provide the charging information to which a settlement exchange rate for data use of the user terminal is applied, depending on a member or non-member of the user terminal or the result of the security authentication for a wired backhaul network or a wireless backhaul network for data use.

Advantageous Effects of the Invention

According to an embodiment of the inventive concept, a virtual marketplace where a plurality of unspecified user terminals may receive and use ECObit shared over a data network opened by a donor terminal may be provided.

Furthermore, according to an embodiment of the inventive concept, a reward as much as a data capacity shared by a donor terminal may be provided and charging information corresponding to data use may be provided to a user terminal, thus providing a fair and meaningful compensation system.

BEST MODE

Hereinafter, embodiments according to the inventive concept will be described in detail with reference to the accompanying drawings. However, the inventive concept is restricted or limited to embodiments of the inventive concept. Further, like reference numerals shown in each drawing indicates like members.

Further, the terminology used in the specification may be terms used to properly represent an exemplary embodiment of the inventive concept and may vary according to intention of a viewer or an operator or custom of a field included in the inventive concept. Therefore, the terminology will be defined based on contents across the specification.

Embodiments of the inventive concept are the gist of providing a technology of allowing a user terminal to use a data capacity shared by a donor terminal.

In the inventive concept, when there is a spare for a limit to the total amount of data of an Internet service, a terminal may perform a saving process of opening and providing a data capacity to unspecified individuals to allow the unspecified individuals to access the Internet and may perform a borrowing process of using Internet access opened by another donor member when there is a need for data access.

Due to this, the inventive concept may provide an exchange marketplace of the saving process and the borrowing process, thus providing an efficient data capacity sharing platform.

Hereinafter, embodiments of the inventive concept will be described in detail with reference to FIGS. 1 to 4.

Figure 1:
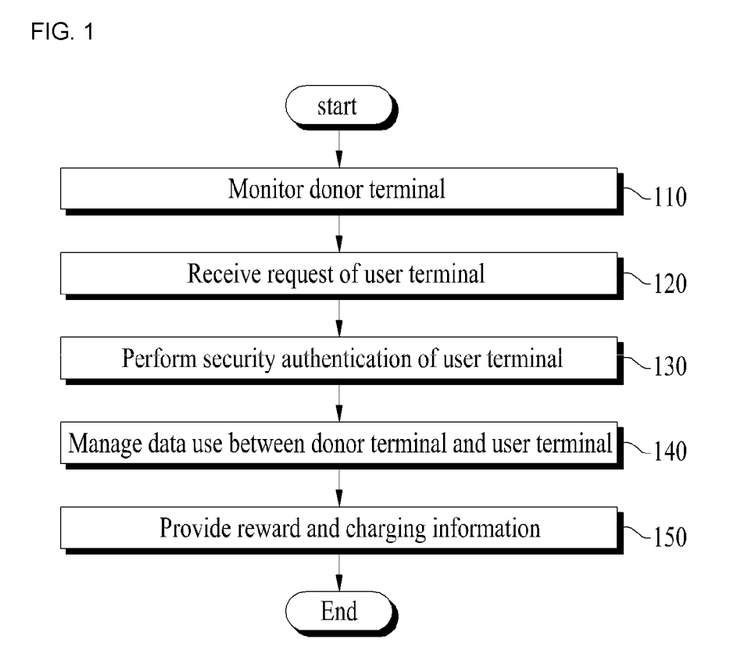
FIG. 1 illustrates a flowchart of a method for sharing a data capacity donated by a terminal according to an embodiment of the inventive concept.
Figure 2:
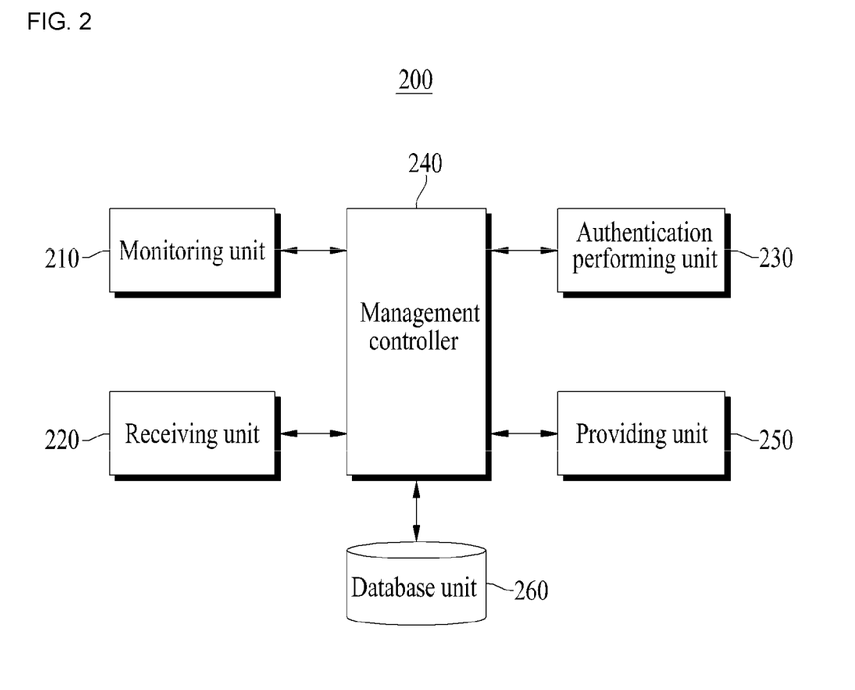
FIG. 2 is a block diagram illustrating a detailed configuration of a server for sharing a data capacity donated by a terminal according to an embodiment of the inventive concept.

FIG. 1 illustrates a flowchart of a method for sharing a data capacity donated by a terminal according to an embodiment of the inventive concept. FIG. 2 is a block diagram illustrating a detailed configuration of a server for sharing a data capacity donated by a terminal according to an embodiment of the inventive concept.

Referring to FIGS. 1 and 2, a server and a method for sharing a data capacity according to an embodiment of the inventive concept may provide a data capacity shared by a donor terminal such that a user terminal receives and uses the data capacity.

To this end, in FIG. 2, a data capacity sharing server 200 according to an embodiment of the inventive concept may include a monitoring unit 210, a receiving unit 220, an authentication performing unit 230, a management controller 240, and a providing unit 250. Furthermore, respective steps (steps 110 to 150) of FIG. 1 may be performed by the components of the data capacity sharing server 200 according to an embodiment of the inventive concept, that is, the monitoring unit 210, the receiving unit 220, the authentication performing unit 230, the management controller 240, and the providing unit 250.

In step 110, the monitoring unit 210 may monitor data information to be shared based on a data tethering signal received from a donor terminal.

The monitoring unit 210 may receive a data tethering signal according to a tethering mode of the donor terminal and may monitory data information including at least one or more of a data tariff used by the donor terminal, a data usage period, or a data capacity to be shared.

For example, when there is a spare for a limit to the total amount of data of a used Internet service (or when there is a residual data capacity), the donor terminal may manually open a data network (or WIFI AP) or may perform a tethering mode of automatically setting a terminal to be in a data network mode (or a WIFI AP mode). Thereafter, the monitoring unit 210 may monitor a data tariff and a data period, which are used by the donor terminal, and a shared data capacity.

At this time, the monitoring unit 210 may monitor the data tariff, the data period, and the data capacity of the donor terminal, but may receive ECObit converted by the donor terminal and may monitor the data tariff, the data period, and the data capacity.

In step 120, the receiving unit 220 may receive a request of a user terminal which is located in communication coverage of the donor terminal and wants to use a data network opened by the donor terminal. At this time, the receiving unit 220 may receive a signal by means of an application installed and run in each of the terminals.

For example, when a data tethering signal is generated because the donor terminal opens the data network in the tethering mode, the user terminal located in the communication coverage of the donor terminal may transmit a data use signal due to the received data tethering signal. At this time, the user terminal may come into contact with the donor terminal to use a data capacity or may perform a setting for using a data capacity by means of an application installed in the terminal. Due to this, the receiving unit 220 may detect the data use signal from the user terminal.

Furthermore, the receiving unit 220 may receive at least one or more of the number, locations, received intensity, data remaining, data tariffs, and data periods of user terminals located in the communication coverage around the donor terminal.

The donor terminal and the user terminal may have a default condition of subscribing to the service and may be single or plural in number. The donor terminal or the user terminal may be a WIFI access point (AP), a WIFI network, or a wired and wireless router such as an egg. Furthermore, the donor terminal or the user terminal may be a terminal device of a donor or a user, for example, a personal computer (PC), a laptop computer, a smart phone, a tablet, or a wearable computer, and may perform the overall operation of the service, such as service screen configuration, a data input, data transmission and reception, or data storage, under control of a web/mobile site or a dedicated application. Furthermore, the terminal may refer to an application downloaded and installed in the terminal.

In step 130, the authentication performing unit 230 may perform security authentication depending on whether the user terminal subscribes to the service.

The authentication performing unit 230 may classify the user terminal as a member or a non-member depending on whether the user terminal subscribes to the service and may perform a security authentication mechanism which detects a wired backhaul network or a wireless Internet backhaul network based on 3G, 4G, or another WIFI according to the member or the non-member.

For example, a user should input a specific ID (a service set identifier (SSID)) indicating that the user is a specific member and a specific password to identify authentication. To exclude such a manual input, the user terminal may automatically tokenize and maintain the specific ID (the service set identifier (SSID)) and the specific password by means of the installed application.

The authentication performing unit 230 may compare the tokenized information received from the user terminal via the receiving unit 220 with a data capacity stored and maintained in a database unit 260 to finally determine whether the user terminal is a member, determine a backhaul network, or determine the number of times of use, or the like.

The database unit 260 may store all of IDs and passwords associated with the donor terminal and the user terminal and may update and store information associated with a terminal which subscribes newly or a terminal which withdraws.

Furthermore, the database unit 260 may store and maintain a history, terminal information, a data tariff, a data capacity shared with a data period, or the like of the donor terminal 10 which shares a data capacity and may store and maintain a data use and sharing history, terminal information, the number of times of use, or the like of the user terminal 20.

In step 140, the management controller 240 may manage the use of ECObit into which a data capacity shared by the donor terminal is virtualized and the data use of the user terminal which uses the shared ECObit.

The management controller 240 may manage ECObit to be shared by the donor terminal, ECObit consumed by the donor terminal due to the user terminal, and the data use of the user terminal which uses ECObit.

For example, the donor terminal may provide ECObit into which a data capacity to be shared is virtualized and stored, and the user terminal may receive ECObit over a data network opened by the donor terminal to use an Internet service. At this time, the management controller 240 may manage the capacity of ECObit shared by the donor terminal, a sharing time, the number of user terminals which come into contact with the donor terminal, locations of the user terminals, distances from the user terminals, and the like and may manage the use of ECObit of the user terminal. According to an embodiment, the management controller 240 may manage the real-time situation of the shared ECObit on the basis of data remaining, a data tariff, a data period, or a wired/wireless backhaul network of each of the donor terminal and the user terminal.

At this time, a unit of measuring the shared data capacity may use bit, Byte, K bit, M bit, M Byte, or the like, and the ECObit may be a unit of being exchanged equally with a unit of bit.

Furthermore, the management controller 240 may update, store, and maintain information, associated with sharing data between the donor terminal and the user terminal, which is managed in real time, in the database unit 260.

In step 150, the providing unit 250 may provide the donor terminal with a reward corresponding to the ECObit shared by the donor terminal and may provide the user terminal with charging information according to the use of data used by the user terminal.

As an example, in step 150, the providing unit 250 may provide at least one or more rewards among a data capacity, a cryptocurrency, and a point, which correspond to the ECObit shared by the donor terminal. For example, the providing unit 250 may provide at least one or more rewards among a data capacity, a cryptocurrency, and a point, which are preset as much as the data capacity shared by the donor terminal.

Herein, the providing unit 250 may pay a reward based on a request of the donor terminal.

As another example, in step 150, the providing unit 250 may generate and provide charging information to which a settlement exchange rate for data used by the user terminal is applied, based on a member or a non-member for the user terminal or the result of the security authentication of the wired backhaul network or the wireless backhaul network. For example, the charging information may be the amount of money, a cryptocurrency, or a point for data use and may be a data capacity which should be returned to the data capacity sharing server.

According to an embodiment, the donor terminal may be applied to an ECObit settlement exchange rate in the saving process according to whether the data network permitted to be shared is a wired backhaul network or a backhaul network based on a wireless Internet (3G, 4G, or another WIFI). Furthermore, the user terminal may receive charging information to which a suitable ECObit exchange rate is applied, depending on whether the ECObit used over the opened data network uses a wired backhaul network, a backhaul network of 3G WCDMA, 4G LTE, or any operator of any area, or a wireless backhaul network based on the wireless Internet.

Figure 3:
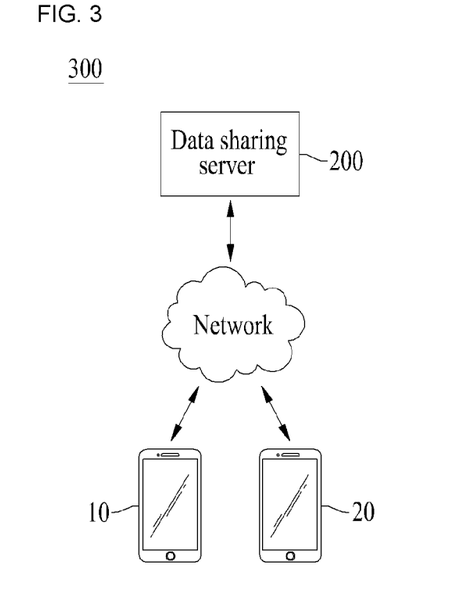
FIG. 3 illustrates a configuration of a system for sharing a data capacity donated by a terminal according to an embodiment of the inventive concept.

FIG. 3 illustrates a configuration of a system for sharing a data capacity donated by a terminal according to an embodiment of the inventive concept.

Referring to FIG. 3, a data capacity sharing system 300 according to an embodiment of the inventive concept may provide a data capacity shared between a donor terminal 10 and a user terminal 20 using a data capacity sharing server 200.

In FIG. 3, the number of the donor terminals 10 and the user terminals is shown as being single, but the data capacity sharing system 300 may include the plurality of donor terminals 10 and the plurality of user terminals 20. Furthermore, the user terminal 20 may be based on being located in communication coverage of the donor terminal 10.

The donor terminal 10 may perform a data tethering mode to donate a data capacity.

For example, when there is a spare data capacity, the donor terminal may open a wired and wireless data network in the tethering mode to share a data capacity. Thus, the donor terminal 10 may receive at least one or more rewards among a data capacity, a cryptocurrency, and a point, which correspond to the data capacity to be shared, from the data capacity sharing server 200.

In more detail, the donor terminal 10 may convert and store a shareable data capacity into virtualized ECObit and may share the ECObit with the user terminal 20 which wants to use the data capacity. Thereafter, the donor terminal 10 may receive and use a data capacity which is as much as the shared data capacity (or ECObit) from the data capacity sharing server 200 and may receive a reward, such as a cryptocurrency or a point, except for data depending on a selection.

At this time, the ECObit may be a unit exchanged equally with a unit of bit, and the average required amount of other resources necessary to transmit unit bit may be comprehensively represented as 1 ECObit. This may be a kind of token (or coin).

The donor terminal 10 may sell ECObit to be shared to the plurality of user terminals 20. For example, the donor terminal 10 may notify the plurality of user terminals 20 of ECObit, in which a real-time exchange rate according to a country and time when a donor and a user are located is reflected, by means of the data capacity sharing server 200 and may sell ECObit depending on a joint bidding scheme of the plurality of user terminals for purchasing ECObit to which the exchange rate is applied. According to an embodiment, the donor terminal 10 may set an upper limit price and a lower limit price of ECObit to which the exchange rate is applied and may sell ECObit in a bidding scheme among the plurality of user terminals 20 in the price range. The donor terminal 10 may select a terminal device to sell ECObit among the plurality of user terminals 20.

As an embodiment, the data capacity sharing system 300 may apply a real-time exchange rate to ECObit shared and sold from the donor terminal and may provide, control, and manage a bidding scheme for ECObit between the donor terminal 10 and the user terminal 20.

The user terminal 20 may be located in communication coverage of the donor terminal 10 and may use a data capacity shared over the data network opened by the donor terminal 10.

For example, the user terminal 20 may be located in the communication coverage of the donor terminal 10 and may receive ECObit shared over the data network opened by the donor terminal 10 to use an Internet service. Due to this, a user may facilitate Internet access as much as needed in real time over the data network (or a WIFI AP) opened by a local donor who exists around the user without purchasing a SIM card or the like of a local mobile carrier in any country in the world.

According to an embodiment, when the plurality of user terminals 20 are located in communication coverage of the donor terminal 10, the data capacity sharing system 300 according to an embodiment of the inventive concept may resolve it in a first in first out (FIFO) scheme or may connect the data network opened by the donor terminal 10 having the strongest WIFI signal intensity from the user terminal 20. Thus, the data capacity sharing system 300 may provide ECObit of the donor terminal 10 to the user terminal which meets a certain condition of being located in a specific space in a specific time (the remaining capacity of the battery, a remaining data capacity, or the like).

According to an embodiment, a data network (or an access point (AP)) opened by the donor terminal 10 and the user terminal 20 may move in real time. In such a case, the data capacity sharing system 300 may ensure continuity and mobility of the service. At this time, the data network may refer to the donor terminal 10 itself and may be a WIFI AP having a service set identifier (SSID).

As an example, when the data network (or the access point (AP)) opened by the donor terminal 10 is fixed and when the user terminal 20 moves, the user terminal 20 may continuously access the data network with strongest WIFI signal intensity to receive ECObit. For a handover where the data network is fixed and when the user terminal 20 moves in real time, the data capacity sharing system 300 may provide a handoff upon data access between data networks.

As another example, when the data network (or the access point (AP)) opened by the donor terminal 10 moves and when the user terminal 20 is fixed, because there are the plurality of donor terminals 10 (donor stations) for providing tethering, the data capacity sharing system 300 may support a transaction record handoff as well as a handoff between the donor terminal of a new data network and the donor terminal 10 of a data network moved to another area and a connection handover therebetween. For example, the data capacity sharing system 300 may provide a handoff between the donor terminal 10 and the user terminal 20, a transaction record handoff, and a connection handover.

Herein, in such a case, because there are data networks (or access points (APs)) opened by the plurality of donor terminals 10 from the user terminal point of view, the user terminal 20 may continuously access the donor terminal 10 having the strongest WIFI signal intensity among the plurality of donor terminals 10 to receive ECObit or may perform a method of maintaining access to the donor terminal 10 previously accessed without change.

Herein, that the data network (or the access point (AP)) opened by the donor terminal 10 moves and that the user terminal 20 is fixed may be that the data network providing tethering moves and that the user terminal 20 is relatively fixed, but may be a situation where both the data network (or the access point (AP)) opened by the donor terminal 10 and the user terminal 20 move depending on an absolute standard.

At this time, the donor terminal 10 and the user terminal 20 may have a default condition where they subscribe to a data capacity sharing platform provided by the data capacity sharing system 300 and may be single or plural in number. The donor terminal 10 or the user terminal 20 may be a WIFI access point (AP), a WIFI network, or a wired and wireless router such as an egg. Furthermore, the donor terminal 10 or the user terminal 20 may be a terminal device of a donor or a user, for example, a personal computer (PC), a laptop computer, a smart phone, a tablet, or a wearable computer, and may perform the overall operation of the service, such as service screen configuration, a data input, data transmission and reception, or data storage, under control of a web/mobile site or a dedicated application. Furthermore, the terminal may refer to an application downloaded and installed in the terminal.

To use ECObit shared from the donor terminal 10, the user terminal may have a history of donating data, may pay cash such as cryptocurrency, or may view an advertisement.

As an example, when the user terminal 20 has a history of sharing or selling a data capacity as a donor in the data capacity sharing system 300, it may request ECObit as much as the shared or sold data capacity from the data capacity sharing server 200. Thus, the user terminal 20 may use ECObit shared from the donor terminal 20, which is as much as the capacity in which the data capacity is shared or sold.

As another example, the user terminal 20 may buy (purchase) ECObit sold by the donor terminal 10. At this time, the user terminal 20 may pay a cryptocurrency, a point, or cash to the donor terminal 10 by a data capacity to be used and may receive ECObit from the donor terminal 10 to use an Internet service. According to an embodiment, because the cashed ECObit indicates a value to which an exchange rate according to a country and time when a donor and a user are located is applied, it may be varied and may be included in a price range preset by the data capacity sharing system 300 or a price range set by the donor.

As another example, the user terminal 20 may use ECObit shared from the donor terminal 20, after viewing an advertisement provided by the data capacity sharing server 200. For example, the data capacity sharing server 200 may provide an advertisement as much as a data capacity requested by the user terminal 20, and the user terminal 20 may receive ECObit shared by the donor terminal 10 and may use an Internet service by viewing the advertisement.

When data networks (or access points (APs)) are opened from the plurality of donor terminals 10, the user terminal 20 may select one data network among the plurality of donor terminals 10 in the form of an auction. For example, the user terminal 20 may receive information associated with a condition of exchanging or sharing a data capacity from the data capacity sharing server 200 and may select any data network based on the information associated with the exchanging condition.

When there is a spare for a limit to the total amount of data of a used Internet service (or when there is a residual data capacity), the user terminal may convert the data capacity into virtualized ECObit and may sell the ECObit to the data capacity sharing server 200.

When a data tethering signal is received from the donor terminal 10, the data capacity sharing server 200 may monitor data information associated with the donor terminal 10 and may manage the sharing of ECObit into which a data capacity between the donor terminal 10 and the user terminal 20 is virtualized.

The data capacity sharing server 200 may receive a data tethering signal according to a tethering mode of the donor terminal 10 and may monitor a data tariff and a data period, which are used by the donor terminal 10, a shared data capacity, and ECObit corresponding to the data capacity.

Furthermore, the data capacity sharing server 200 may receive a data use signal transmitted from the user terminal 20 which is located in communication coverage of the donor terminal 10 and wants to use a data capacity. Thus, the data capacity sharing server 200 may perform a security authentication mechanism for the user terminal 20 which wants to use a data capacity.

For example, the data capacity sharing server 200 may classify the user terminal 20 as a member or a non-member depending on whether the user terminal 20 subscribes to the service and may perform security authentication about the user terminal 20 which detects a wired backhaul network or a wireless Internet backhaul network based on 3G, 4G, or another WIFI according to the member or the non-member and communicates with the donor terminal 10.

The data capacity sharing server 200 may tokenize and store an ID and a password of each of terminals which subscribe to the service in a database unit and may identify a data capacity which is stored and maintained in the database unit to finally determine whether the user terminal 20 is a member, a backhaul network, the number of times of use, or the like.

The database unit may store all of IDs and passwords associated with the donor terminal 10 and the user terminal 20 and may update a data capacity depending on a terminal which subscribes newly or a terminal which withdraws.

The data capacity sharing server 200 may manage ECObit to be shared by the donor terminal 10, ECObit consumed by the donor terminal 10 due to the user terminal 20, and data use of the user terminal 20 which uses ECObit.

For example, the donor terminal 10 may provide ECObit into which a data capacity to be shared is virtualized and stored, and the user terminal 20 may receive ECObit from the donor terminal 10 to use an Internet service. At this time, the data capacity sharing server 200 may manage the capacity of ECObit shared by the donor terminal 10, a sharing time, the number of user terminals which come into contact with the donor terminal 10, locations of the user terminals 20, distances from the user terminals 20, and the like and may manage the use of ECObit of the user terminal 20. According to an embodiment, the data capacity sharing server 200 may manage the real-time situation of the shared ECObit on the basis of data remaining, a data tariff, a data period, or a wired/wireless backhaul network of each of the donor terminal 10 and the user terminal 20.

At this time, a unit of measuring a shared data capacity may use bit, Byte, K bit, M bit, M Byte, or the like, and the ECObit may be a unit of being exchanged equally with a unit of bit.

Thereafter, the data capacity sharing server 200 may provide the donor terminal 10 with a reward corresponding to ECObit shared by the donor terminal 10 and may provide the user terminal 20 with charging information according to the use of data used by the user terminal 20.

As an example, the data capacity sharing server 200 may provide at least one or more rewards among a data capacity, a cryptocurrency, and a point, which correspond to the ECObit shared by the donor terminal 10. For example, the data capacity sharing server 200 may provide at least one or more rewards among a data capacity, a cryptocurrency, and a point, which are preset as much as the data capacity shared by the donor terminal 10.

Herein, the data capacity sharing server 200 may pay a reward based on a request of the donor terminal 10.

As another example, the data capacity sharing server 200 may generate and provide charging information to which a settlement exchange rate for data used by the user terminal 20 is applied, based on a member or a non-member for the user terminal 20 or the result of the security authentication of the wired backhaul network or the wireless backhaul network. For example, the charging information may be the amount of money, a cryptocurrency, or a point for the use of data and may be a data capacity which should be returned to the data capacity sharing server.

The data capacity sharing server 200 may purchase a data capacity from the donor terminal 10 and the user terminal 20. For example, when there is a spare for a limit to the total amount of data of the used Internet service, a donor and a user may sell ECObit into which a data capacity is virtualized to the data capacity sharing server 200. The data capacity sharing server 200 may buy (purchase) ECObit from the donor terminal 10 and the user terminal 20.

At this time, at a time when purchasing ECObit from the donor terminal 10 and the user terminal 20, the data capacity sharing server 200 may calculate the amount of money per ECObit depending on the demand/supply of ECObit, and may calculate the amount of money per ECObit by applying an exchange rate according to a country and time when the donor and the user are located. In other words, the price of the sold ECObit may be varied in real time.

Furthermore, the data capacity sharing server 200 may sell the purchased data capacity to a third terminal (a user terminal).

Referring to FIG. 3, the donor terminal 10 and the user terminal 20 are separately shown, but the donor terminal 10 which shares a data capacity may be a user who receives ECObit from a donor to use an Internet service according to an embodiment. Furthermore, the user terminal 20 which receives ECObit from the donor terminal 10 to use the Internet service may be a donor who shares and donate his or her data capacity according to an embodiment.

Due to this, in the data capacity sharing system 300, only the donor terminal 10 which physically exists in a specific location in a specific time may be a donor, and only the user terminal 20 located in communication coverage of the donor terminal 10 may provide a data capacity sharing platform between the donor terminal 10 and the user terminal 20, which is capable of using the data capacity. Thus, there is no need to perform unnecessary calculation, and, because a reward including ECObit as much as contributed actually is compensated, equality of opportunity may be ensured. Furthermore, the data capacity sharing system 300 may obtain revenue from advertising fees provided between the data capacity sharing server 200, the donor terminal 10, and the user terminal 20.

According to an embodiment, the data capacity sharing system 300 may provide Uber which is a shared taxi with an access point (AP), a WIFI network, and the donor terminal 10 which is egg. A plurality of users who ride in the taxi may receive ECObit over the shared data network from the donor terminal 10 in the taxi using the user terminals 20 they have and may use the Internet service.

Figure 4:
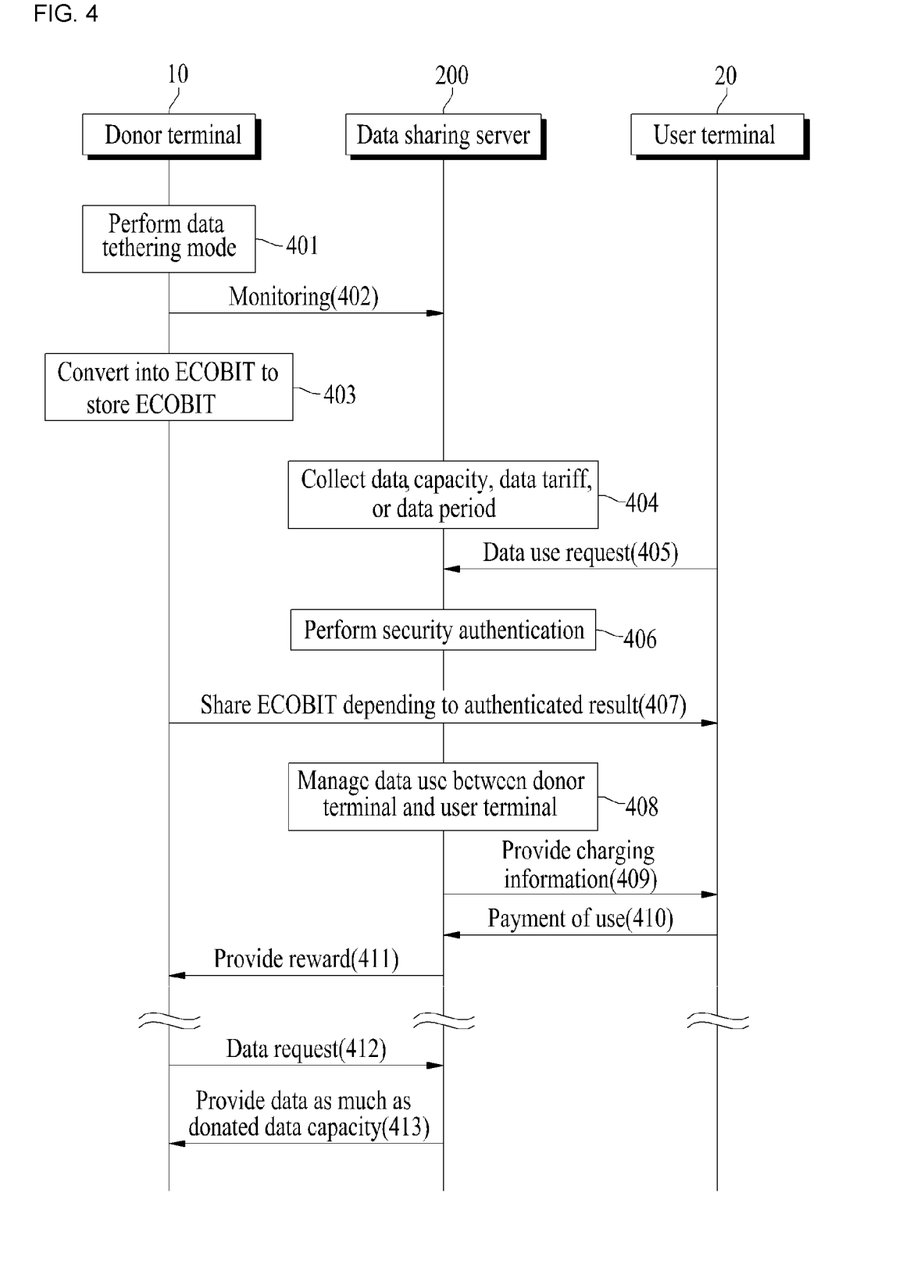
FIG. 4 is a signal sequence diagram illustrating a process for sharing a data capacity among a data capacity sharing server, a donor terminal, and a user terminal according to an embodiment of the inventive concept.

FIG. 4 is a signal sequence diagram illustrating a process for sharing a data capacity among a data capacity sharing server, a donor terminal, and a user terminal according to an embodiment of the inventive concept.

A data capacity sharing server 200 according to an embodiment of the inventive concept may communicate with a plurality of donor terminals 10 and a plurality of user terminals 20, but will be described using the single donor terminal 10 and the single user terminal 20 to describe a more clear description below.

Furthermore, the donor terminal 10 and the user terminal 20 shown in FIG. 4 may refer to terminal devices of a donor and a user, respectively.

The donor terminal 10 or the user terminal 20 may be a WIFI access point (AP), a WIFI network, or a wired and wireless router such as an egg. Furthermore, the donor terminal 10 or the user terminal 20 may be a terminal device of the donor or the user, for example, a personal computer (PC), a laptop computer, a smart phone, a tablet, or a wearable computer, and may perform the overall operation of the service, such as service screen configuration, a data input, data transmission and reception, or data storage, under control of a web/mobile site or a dedicated application.

Embodiments of the inventive concept described below may be performed by means of an application downloaded and installed in a terminal device such as the donor terminal 10 or the user terminal 20.

Referring to FIG. 4, a donor having a spare for a limit to the total amount of data of a used Internet service may manually open a data network (or a WIFI AP) or may perform a tethering mode of automatically setting a terminal to be in a data network mode (or a WIFI AP mode) (step 401).

Thus, the data capacity sharing server 200 may monitor the donor terminal 10 depending on a data tethering signal received by the tethering mode of the donor terminal 10 (step 402).

After step 401, the donor terminal 10 may convert and store a data capacity to be donated and shared into virtualized ECObit (step 403). At this time, the ECObit may be a unit exchanged equally with a unit of bit, and the average required amount of other resources necessary to transmit unit bit may be comprehensively represented as 1 ECObit. This may be a kind of token (or coin).

The data capacity sharing server 200 may collect at least one or more data information among a data tariff used in the donor terminal 10, a data usage period, or a shared data capacity, based on the result monitored in step 402 (step 404). At this time, the data capacity sharing server 200 may collect the data information associated with the donor terminal 10 based on the monitored result, but may receive the ECObit in step 403 and may collect the data information associated with the donor terminal 10.

In step 405, a request of the user terminal 20 which is located in communication coverage of the donor terminal 10 and wants to use a data network opened by the donor terminal 10 may be received.

For example, in step 405, the data capacity sharing server 200 may receive a location, received intensity, data remaining, a data tariff, a data period, and the like of the user terminal 20 located in communication coverage around the donor terminal 10.

In step 406, the data capacity sharing server 200 may perform security authentication for the received user terminal 20. For example, the data capacity sharing server 200 may classify the user terminal 20 as a member or a non-member depending on whether the user terminal 20 subscribes to the service and may perform a security authentication mechanism which detects a wired backhaul network or a wireless Internet backhaul network based on 3G, 4G, or another WIFI according to the member or the non-member.

The security authentication mechanism may be performed to apply a settlement exchange rate for data use at the same time as performing security authentication of the user terminal 20 which wants to use ECObit shared from the donor terminal 10.

In detail, in step 406, the data capacity sharing server 200 may identify a data capacity stored and maintained in a database unit using a unique ID and a unique password (PW) received from the user terminal 20 and may finally determine whether there is security for the user terminal. Due to this, the data capacity sharing server 200 may extract the member or non-member for the user terminal 20 and the result of the security authentication of the wired backhaul network or the wireless backhaul network.

Based on the result of the security authentication in step 406, the user terminal 20 may receive ECObit shared over the data network opened by the donor terminal 10 and may use an Internet service (step 407).

In step 408, the data capacity sharing server 200 may manage ECObit to be shared by the donor terminal 10, ECObit consumed by the donor terminal 10 due to the user terminal 20, and data use of the user terminal 20 which uses ECObit. According to an embodiment, the data capacity sharing server 200 may manage the real-time situation of the shared ECObit on the basis of data remaining, a data tariff, a data period, or a wired/wireless backhaul network of each of the donor terminal 10 and the user terminal 20.

After step 408, in steps 409 and 410, the data capacity sharing server 200 may generate and provide charging information to which a settlement exchange rate for data used by the user terminal 20 is applied, based on the member or non-member for the user terminal 20 and the result of the security authentication of the wired backhaul network or the wireless backhaul network. Thus, the user terminal 20 may return a data capacity or may perform payment such as cryptocurrency payment, card payment, or point payment, with respect to the charging information. At this time, the charging information may be the amount of money, a cryptocurrency, or a point for data use and may be a data capacity which should be returned to the data capacity sharing server 200.

After step 408, in step 411, the data capacity sharing server 200 may provide at least one or more rewards among a data capacity, a cryptocurrency, and a point, which correspond to the ECObit shared by the donor terminal 10. For example, the data capacity sharing server 200 may provide at least one or more rewards among a data capacity, a cryptocurrency, and a point, which are preset, to the donor terminal 10 which shares the data capacity.

Herein, the data capacity sharing server 200 may pay a reward based on a request of the donor terminal 10.

Referring to steps 412 and 413, the donor terminal 10 may request a data capacity from the data capacity sharing server 200 to use data as much as the shared data capacity. Thus, the data capacity sharing server 200 may provide a data capacity corresponding to the shared ECObit and may provide a cryptocurrency, a point, or the like except for data as a reward, depending on a data request of the donor terminal 10.

In other words, the donor terminal 10 may be compensated for data as much as the shared data and may be compensated for a cryptocurrency, a point, or the like except for data depending on a selection.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An operation method of a server for sharing a data capacity donated by a terminal, the method comprising:
   monitoring data information to be shared based on a data tethering signal received from a donor terminal;
   receiving a request of a user terminal which is located in communication coverage of the donor terminal and wants to use a data network opened by the donor terminal;
   performing security authentication depending on whether the user terminal subscribes to a service;
   managing use of ECObit into which a data capacity shared by the donor terminal is virtualized and data use of the user terminal which uses shared ECObit; and
   providing the donor terminal with a reward corresponding to ECObit shared by the donor terminal and providing the user terminal with charging information according to the use of data used by the user terminal.

2. The method of claim 1, wherein the monitoring of the data capacity shared by the donor terminal includes:
   receiving the data tethering signal according to a tethering mode of the donor terminal and monitoring the data information including at least one or more of a data tariff used by the donor terminal, a data usage period, or a data capacity to be shared.

3. The method of claim 1, wherein the performing of the security authentication includes:
   classifying the user terminal which wants to use ECObit as a member or a non-member depending on whether the user terminal subscribes to the service and performing a security authentication mechanism of the user terminal which detects a wired backhaul network or a wireless backhaul network according to the member or the non-member and communicates with the donor terminal.

4. The method of claim 1, wherein the managing of the use of the ECObit and data includes:
   tracking and managing ECObit to be shared by the donor terminal, ECObit consumed by the donor terminal due to the user terminal, and the data use of the user terminal which uses ECObit.

5. The method of claim 1, wherein the providing of the reward and the charging information includes:
   providing at least one or more rewards among a data capacity, a crytocurrency, and a point, which correspond to the ECObit shared by the donor terminal, depending on a request of the donor terminal.

6. The method of claim 5, wherein the providing of the reward and the charging information includes:
   providing the charging information to which a settlement exchange rate for the data use of the user terminal is applied, depending on a member or non-member of the user terminal or the result of the security authentication for a wired backhaul network or a wireless backhaul network for data use.

7. A system for sharing a data capacity donated by a terminal, the system comprising:
   a donor terminal configured to perform a data tethering mode to donate a data capacity;
   a user terminal configured to be located in communication coverage of the donor terminal and use a data network opened by the donor terminal; and
   a data capacity sharing server configured to monitor data information to be shared by the donor terminal based on a data tethering signal received from the donor terminal and manage sharing of ECObit into which a data capacity between the donor terminal and the user terminal is virtualized,
   wherein the data capacity sharing server provides the donor terminal with a reward corresponding to ECObit shared by the donor terminal and provides the user terminal with charging information according to the use of data used by the user terminal.

8. The system of claim 7, wherein the donor terminal receives at least one or more rewards among a data capacity, a crytocurrency, and a point, which correspond to the shared ECObit, from the data capacity sharing server.

9. The system of claim 7, wherein the user terminal receives and uses ECObit shared over the data network opened by the donor terminal having the strongest signal intensity from the user terminal among a plurality of donor terminals located in the periphery.

10. The system of claim 7, wherein the data capacity sharing server classifies the user terminal which wants to use a data capacity as a member or a non-member depending on whether the user terminal subscribes to a service and performs a security authentication mechanism of the user terminal which detects a wired backhaul network or a wireless backhaul network according to the member or the non-member and communicates with the donor terminal.

11. The system of claim 7, wherein the data capacity sharing server tracks and manages ECObit to be shared by the donor terminal, ECObit consumed by the donor terminal due to the user terminal, and data use of the user terminal which uses ECObit.

12. The system of claim 7, wherein the system for sharing the data capacity obtains revenue from advertising fees provided between the data capacity sharing server, the donor terminal, and the user terminal.

13. The system of claim 7, wherein the user terminal selects one of data networks (or access points (APs)) respectively opened by a plurality of donor terminals, when there are the plurality of donor terminals, and wherein the data capacity sharing server provides information associated with an exchange condition such that the user terminal selects the one data network.

14. The system of claim 7, wherein the user terminal sells a possessed residual data capacity to the data capacity sharing server.

* * * * *